United States Patent
Seiler et al.

(10) Patent No.: US 9,694,649 B2
(45) Date of Patent: Jul. 4, 2017

(54) ELECTRIC HEATING, VEHICLE COMPRISING AN ELECTRIC HEATING AS WELL AS METHOD FOR CONTROLLING AN ELECTRIC HEATING

(75) Inventors: Heinz Seiler, Munich (DE); Norbert Botzenmayer, Benediktbeuern (DE); Michael Zeyen, Herxheim (DE); Dietmar Bytzek, Germersheim (DE)

(73) Assignee: WEBASTO SE, Stockdorf (DE)

( * ) Notice: Subject to any disclaimer, the term of this patent is extended or adjusted under 35 U.S.C. 154(b) by 832 days.

(21) Appl. No.: 13/981,070

(22) PCT Filed: Dec. 14, 2011

(86) PCT No.: PCT/EP2011/072792
§ 371 (c)(1),
(2), (4) Date: Aug. 26, 2013

(87) PCT Pub. No.: WO2012/100878
PCT Pub. Date: Aug. 2, 2012

(65) Prior Publication Data
US 2013/0327842 A1    Dec. 12, 2013

(30) Foreign Application Priority Data
Jan. 28, 2011   (DE) .......................... 10 2011 009 672

(51) Int. Cl.
*B60H 1/22*        (2006.01)
*H05B 1/02*        (2006.01)
(Continued)

(52) U.S. Cl.
CPC ........... *B60H 1/2218* (2013.01); *F24D 13/02* (2013.01); *H05B 1/0236* (2013.01);
(Continued)

(58) Field of Classification Search
CPC ................ B60H 1/2218; H05B 1/0236; H05B 2203/035; F24D 13/02; F24D 19/1096; F24D 2200/08
(Continued)

(56) References Cited

U.S. PATENT DOCUMENTS 3,557,325 A * 1/1971 Hansen ...................... H02P 7/18
                                                          200/19.07
3,562,617 A * 2/1971 Meier .................. H02H 7/0844
                                                          361/109
(Continued)

FOREIGN PATENT DOCUMENTS

CN          2135491 Y       6/1993
CN          1397449 A       2/2003
(Continued)

OTHER PUBLICATIONS

International Search Report, mailing date of Mar. 12, 2012 for PCT/EP2011/072792 (11 pgs.).
Machine Translation into English of DE102007012631.

*Primary Examiner* — Gregory Huson
*Assistant Examiner* — Daniel E Namay
(74) *Attorney, Agent, or Firm* — Fitch, Even, Tabin & Flannery LLP (57) ABSTRACT

Electric heating having at least one first resistance heating device and a second resistance heating device, at least one pulse width modulation device, which is capable of a pulse width modulated operation of the first resistance heating device and/or the second resistance heating device, as well as at least one switching device. For a heating operation, the switching device can be capable of selectively switching the first resistance heating device and the second resistance heating device between a first heating mode in which the first resistance heating device and the second resistance heating device are electrically connected in series, and a
(Continued)

second heating mode in which the first resistance heating device and the second resistance heating device are electrically connected in parallel. A vehicle having electric heating as well as to a method for controlling electric heating is also provided.

14 Claims, 3 Drawing Sheets (51) Int. Cl.
F24D 13/02 (2006.01)
F24D 19/10 (2006.01)
(52) U.S. Cl.
CPC ...... F24D 19/1096 (2013.01); F24D 2200/08 (2013.01); H05B 2203/035 (2013.01)
(58) Field of Classification Search
USPC ..... 126/12.3 A, 12.4; 237/12.3 A, 12.4, 2 A; 392/318, 327; 219/482
IPC .............. B60H 1/22; H05B 1/02; F24D 13/02, 19/10
See application file for complete search history.

(56) References Cited

U.S. PATENT DOCUMENTS

| | | | | |
|---|---|---|---|---|
| 3,565,202 A * | 2/1971 | Evans | ...................... | B60L 11/02 105/36 |
| 3,577,050 A * | 5/1971 | Ringland | .................. | B60K 1/00 318/146 |
| 3,577,929 A * | 5/1971 | Onoda | .................. | B60L 15/005 104/290 |
| 3,585,358 A * | 6/1971 | Nilssen | ................ | B60H 1/2218 219/202 |
| 3,585,473 A * | 6/1971 | Huxtable | ............ | H02P 29/0022 290/14 |
| 5,119,283 A * | 6/1992 | Steigerwald | ............ | H02M 1/10 323/207 |
| 5,157,592 A * | 10/1992 | Walters | ..................... | G05F 1/38 363/132 |
| 5,442,540 A * | 8/1995 | Hua | ...................... | H02M 3/158 363/132 |
| 5,448,155 A * | 9/1995 | Jutras | ...................... | G05F 1/565 323/266 |
| 5,628,929 A * | 5/1997 | Klosterman | ............ | G05D 23/24 219/209 |
| 5,662,025 A * | 9/1997 | Yoo | ........................ | A47J 27/004 219/448.11 |
| 6,040,561 A * | 3/2000 | Murty | ................. | B60H 1/00392 219/494 |
| 6,078,024 A * | 6/2000 | Inoue | .................. | F28D 1/05366 165/299 |
| 6,107,610 A * | 8/2000 | Tarr | ..................... | B29C 45/2737 219/494 |
| 6,303,911 B1 * | 10/2001 | Welch, Jr. | ......... | G02F 1/133382 219/483 |
| 6,772,640 B1 | 8/2004 | Quigley et al. | | |
| 9,038,400 B2 * | 5/2015 | Goenka | .............. | B60H 1/00478 62/244 |
| 2002/0125859 A1 * | 9/2002 | Takeo | ................ | B60H 1/00428 320/137 |
| 2003/0217559 A1 * | 11/2003 | Ieda | .................... | B60H 1/00428 62/230 |
| 2004/0094529 A1 * | 5/2004 | Richter | .................... | H05B 3/84 219/202 |
| 2004/0232137 A1 | 11/2004 | Cook et al. | | |
| 2008/0283516 A1 | 11/2008 | Talle et al. | | |
| 2008/0308542 A1 * | 12/2008 | Day | .......................... | B60L 1/02 219/203 |
| 2010/0222937 A1 * | 9/2010 | Nemesh | ............. | G05D 23/1912 700/300 |
| 2010/0287952 A1 * | 11/2010 | Goenka | ............. | B60H 1/00478 62/3.1 |
| 2011/0296818 A1 * | 12/2011 | Hashimoto | ......... | F02D 41/1494 60/286 |
| 2013/0286526 A1 * | 10/2013 | Satoh | ..................... | H02H 5/047 361/105 |
| 2013/0327842 A1 * | 12/2013 | Seiler | .................. | H05B 1/0236 237/12.4 |
| 2015/0298523 A1 * | 10/2015 | Patel | .................. | B60H 1/00778 237/2 A |
| 2015/0298524 A1 * | 10/2015 | Goenka | ............. | B60H 1/00478 165/202 |

FOREIGN PATENT DOCUMENTS

| | | | | |
|---|---|---|---|---|
| CN | 201138869 Y | 10/2008 | | |
| DE | 3509073 A1 | 9/1985 | | |
| DE | 102005010470 A | 9/2006 | | |
| DE | 102007012631 A1 | 9/2008 | | |
| DE | 10 2008 056 757 A1 | 6/2009 | | |
| GB | 2043235 A * | 10/1980 | ......... | B60H 1/00314 |
| JP | H07-199702 A | 8/1995 | | |
| JP | 2007-273420 A | 10/2007 | | |
| KR | 20030041152 A | 5/2003 | | |
| WO | 02089526 A2 | 11/2002 | | |

* cited by examiner

ELECTRIC HEATING, VEHICLE COMPRISING AN ELECTRIC HEATING AS WELL AS METHOD FOR CONTROLLING AN ELECTRIC HEATING

CROSS REFERENCE TO RELATED APPLICATIONS

This application is a U.S. national phase application of International Application No. PCT/EP2011/072792, filed Dec. 14, 2011, which claims benefit of the priority date of German Application 10 2011 009 672.8, filed Jan. 28, 2011, which are hereby incorporated herein by reference in their entirety.

The present invention relates to an electric heating as well as a vehicle comprising and electric heating and a method for controlling an electric heating.

In modern vehicles often engine-independent vehicle heaters or auxiliary heating systems are used. In many cases such heating systems are equipped with a burner to burn a fuel of the vehicle. In the increasingly frequently occurring electric vehicles which are operated without fuel such engine-independent or auxiliary heating systems cannot be used since electric vehicles usually do not carry any fuel, and it is unreasonable to provide a fuel tank exclusively for a heating system. Instead, using an electrically operated heating system lends itself to electric vehicles. An electric heating may, however, also be provided for the use in vehicles having internal combustion engines, for example to save fuel. In operation, electric heaters may respond sensitively to fluctuations of the heating voltage supplied to its heating elements. On the other hand, electric heaters themselves are consumers having high performance requirements so that a fluctuating, for example pulsed heating operation has negative effects on the stability of the voltage supply. For example, ripple currents may develop in an electric heating which may spread across an electric network to which the heating system is connected.

It is an object of the present invention to provide an electric heating which may be controlled efficiently and accurately even in case of varying supply voltages or a fluctuating supply voltage. A vehicle provided with such a heating system as well as an efficient method for controlling an electric heating are also to be provided.

This object is solved by the features of the independent claims.

Further advantageous embodiments and further developments of the invention will become obvious from the dependent claims.

Within the framework of the present description an electric heating is to be understood to be a heating system converting electric power into heat to directly or indirectly heat a medium or a volume. Such a medium may be a fluid such as a gas, for example air or a liquid such as water. The electric heating is, in particular, provided for a mobile deployment, for example for a vehicle such as an electric vehicle. To convert electric power into heat, for example, a resistance heating device may be used. A resistance heating device may comprise one or more electric resistors or heating elements. An electric resistor which generates heat when an electric current flows through it may be regarded as a heating resistor or heating element. Such a heating resistor of a resistance heating system is generally provided with a high resistance value as compared to the line resistance. A heating resistor may, for example, be formed as a conducting wire or heating wire wound to a coil. A resistance heating system may be characterised in that a major part or the major part the heat generated by it is generated by one or more electric resistors. It may, in particular, be contemplated that the electric power transformed by a resistance heating system is substantially or to the largest part converted into heat. The resistance value of a resistance heating system or heating resistor effective for generating heat or for heating a medium or volume provided for heating may be referred to as heating resistance value. Such a resistance heating system or heating resistor may, in particular, comprise or be manufactured of a metallic and/or conductive material. The material may have an electric resistance substantially increasing linearly with the temperature. It may, in particular, be reasonable that a heating resistor or a resistance heating system comprises or is manufactured of a posistor material. The material may be non-ceramic. A voltage source or current source may provide a heating voltage or a heating current for the electric heating. Here particularly an on-board network of a vehicle, particularly of an electric vehicle, may serve as the voltage source of a heating voltage. The heating voltage or supply voltage may be a direct voltage. The voltage which is applied to one or more resistance heating systems or heating resistors for converting electric power into heat may be regarded as the heating voltage or supply voltage. A voltage supply may provide a nominal voltage. It may be contemplated that a voltage supply provides a maximum voltage. This maximum voltage may be equal to the nominal voltage or slightly exceed it, in particular by 1%, 5%, 7%, 10% or 20%. A nominal voltage may amount to or exceed 250 V, 400 V, 500 V, 550 V, 600 V or 650 V. The voltage values mentioned here, particularly the threshold values, may be regarded as amount values of voltages. Thus, typically, a voltage of −250 V would have to be regarded as larger as a voltage of −50 V since the amount is larger. Whether a voltage value is below or above a threshold value may, for example, be verified by checking whether an associated change of the voltage value is present. It is feasible that the supply voltage is not temporally constant, for example if, in use, a drop of a voltage below a nominal voltage occurs due to the connection of consumers. An electric heating may be operated in a pulse width modulated manner. In this case the electric heating and/or the resistance heating system or the resistance heating systems of an electric heating may be controlled via a pulse width modulation device so that they are operated in accordance with one or more pulse control signals. In particular, a current flow through a resistance heating system or a heating resistor may take place. In this case, for example, a transistor may permit a current flow through a resistance heating system in accordance with the pulse control signal. Such a transistor may, for example, be a bipolar transistor having an insulated gate electrode (insulated-gate bipolar transistor, IGBT), a metal oxide semiconductor field-effect transistor (MOSFET) or a transistor of another design. A pulse width modulation device may comprise one or more transistors which may be controlled by different or identical pulse control signals. A pulse control signal may be periodical. It may have one or more zero-cycles per period. It is feasible that a pulse control signal is substantially a rectangular signal. Different pulse control signals may, in particular, differ with respect to their phases. As a measurement value of a pulse width modulation a percentage value may be indicated. The percentage value may, in this case, describe the portion of a period or a timeframe in which a pulse control signal permits a current flow through a resistance heating system or a heating resistor. In this connection a temporarily constant signal may be regarded as a signal having a pulse width modulation of 100%. It may be contemplated that a pulse width modulation device does not permit a current flow through one or more than one associated resistance heating system unless an associated pulse control signal is applied. It may be assumed that a pulse control signal for permitting a current flow is applied if the pulse control signal has or exceeds a predetermined amplitude or a predetermined amplitude amount. An electric heating may be designed so as to provide a heating output within a specific output range. In particular, an electric heating may be designed for a maximum heat output. The maximum heat output can be adapted to a maximum and/or a nominal supply voltage. It may be reasonable that the maximum heating output is or exceeds, for example, 3000 W, 4000 W, 5000 W, 6000 W, or 7000 W. An electric heating may be adjustable with regard to its heating output. It may be contemplated that a desired or demanded heating output is adjustable. To this end a setting device may be provided for setting the desired heating output. For switching elements such as transistors it generally applies that they may be in an "on" state if a control signal or switching signal is applied to them so that they permit a specific current flow through them. For transistors this may, in particular, mean that a control signal is applied to a control input (gate) to permit a current flow through the input and the output of the transistor. For electromagnetic switches a switching signal or control signal may act on a solenoid such as a coil to achieve a desired switch position.

An electric heating comprising at least a first resistance heating device and a second resistance heating device is described. The electric heating comprises at least one pulse width modulation device which is capable of a pulse width modulated operation of the first resistance heating device and/or the second resistance heating device, as well as at least one switching device. The switching device is capable of, for a heating operation, optionally switching the first resistance heating device and the second resistance heating device between a first heating mode in which the first resistance heating device and the second resistance heating device are electrically connected in series, and a second heating mode in which the first resistance heating device and the second resistance heating device are electrically connected in parallel. Depending on the heating mode, therefore, the first resistance heating device and the second resistance heating device provide different overall heating resistances which, accordingly, have an effect on the heating performance of the electric heating. In the first and/or the second heating mode the first resistance heating device and the second resistance heating device may be conductively connected to a voltage supply depending on the pulse width modulation device so that a heating current so that a heating current flows or may flow through them. In the second heating mode, if the first resistance heating device and the second resistance heating device are electrically connected in parallel, an altogether lower overall heating resistance will occur for the heating system than in the first heating mode in which the first resistance heating device and the second resistance heating device are electrically connected in series. Owing to the described arrangement a more compact construction of the heating system is ensured which will demand little installation space. The electric heating can also be operated efficiently in case of a temporally adjustable supply voltage. In particular, the different heating modes enable an adjustment of the heating operation to different required heating capacities and varying supply voltages so that an enhanced control of the heating capacity results from the pulse width modulation. The heating resistance values of the first resistance heating device and of the second resistance heating device may be substantially identical or designed differently. In case of identical heating resistance values a particularly uncomplicated handling and control of the electric heating will be accomplished. The resistance heating device, particularly the heating resistors of the resistance heating device, may be in contact with a medium to be heated. The medium may be a fluid such as a gas such as, for example, air, or a liquid such as, for example, water. It may be contemplated that heating resistors of the resistance heating device provided for the contact to a medium to be heated are insulated with regard to the medium, particularly water, by an appropriate electric insulation. In this case it may be reasonable if the insulation has a good thermal conductivity. The electric heating may have two turn-off paths which are switchable independent of each other. A first turn-off path may be provided by the pulse width modulation device. It may, in particular, be reasonable for the pulse width modulation device to interrupt or disable a heating operation of the heating system if it is not supplied with a current or no pulse control signal is applied to it. It may also be contemplated that, if a plurality of pulse control signals and/or pulse control signal paths are used, the pulse width modulation device turns of the heating system, for example because a malfunction has occurred. A second turn-off path may be provided by the switching device. It may be advantageous that the switching device turns off the heating system or interrupts or disables the energy supply to the first resistance heating device and/or to the second resistance heating device when it is in a state in which no current is supplied to it and/or no switching signal is applied and/or a specific switching signal is not applied. The switching device may comprise one, two, or more independently switchable switching elements. The switching elements may be electromechanical and/or semiconductor switching elements. The pulse width modulation device may comprise one, two or more independently switchable elements which may, in particular, be semiconductor elements.

It may be contemplated that the switching device is further capable of, for a heating operation, switching the first resistance heating device and the second resistance heating device into a third heading mode in which exclusively the first resistance heating device or the second resistance heating device is operated. The solely operated resistance heating device may then be switched so that it is conductively connected to a voltage supply depending on the pulse width modulation device so that a heating current flows through it or may flow through it. In particular, it may be contemplated that the resistance heating device not operated in the third heating mode is turned off or not conductively connected to a supply voltage in this heating mode. Therefore an additional heating resistance value may be used for the heating operation which only depends on the first resistance heating device or the second resistance heating device. It may be advisable to form the switching device so that it is capable of switching the first resistance heating device to a sole operation in a third heating mode and of switching the second resistance heating device to a sole operation in a fourth heating mode. Thus a redundancy of the resistance heating device may be realized. In addition, in case the resistance values of the first resistance heating device and of the second resistance heating device are different, a further heating resistance value may be used for a heating operation.

The switching device may be formed as a relay circuit. In particular, one or more electrically operated or operable mechanical switches may be provided as relay elements to switch between the heating modes. Such a switch may be provided as a switching element of the switching device. This enables a robust design of the heating device. It may be advisable that the switching device additionally comprises one or more switchable semiconductor elements as switching elements.

The switching device may be formed as a quasi-full bridge. Here, mainly semiconductor switching elements may be used. Such a quasi-full bridge is cost-effective and space saving. Furthermore, no potentially annoying switching sounds occur with such a solution.

In a further development the heating resistance value of the first resistance heating device may be substantially identical to the heating resistance value of the second resistance heating device. This results in a symmetric and particularly simple design of the electric heating.

In a first heating mode and/or in the second heating mode the first resistance heating device and the second resistance heating device may be connected to a common power source. In this way a simple control and a simple operation of the electric heating may be accomplished.

In particular, the electric heating may comprise a control device or be connected or connectable to a control device. The control device may, for example, be formed as an electronic control device comprising a suitable micro controller or control chip. In this case it may be advisable if the control device communicates with a higher-level control device and/or is formed as a common control device which, in addition to the electric heating, is also capable of controlling other devices. For example, the control device of the electric heating may be connected to an on-board computer of a vehicle, for example via an appropriate vehicle communication network such as a bus system, particularly a CAN bus or LIN bus. It is also feasible that the control device of the electric heating is directly integrated in an on-board computer system of a vehicle or an air conditioning device of the vehicle. The control device may be connected to a setting device for setting a required heating output. It is feasible that the setting device comprises a user interface via which a user can directly or indirectly set or influence the required heating output. The control device may be connected to the switching device and/or the pulse width modulation device via outputs. Particularly, the control device can be designed to control the switching device or switching elements of the switching device by switching signals. It may be contemplated that the control device controls the pulse width modulation device by associated pulse control signals.

The control device may be designed to control the switching device and/or the pulse width modulation device based on a voltage value of a supply voltage and/or a required heating output of the electric heating. Thus the electric heating can well respond to different values of the supply voltage and also be controlled efficiently and accurately in case of differing values of the heating voltage or the supply voltage. In particular, it may be advisable that the control device is designed to control the switching device for a heating mode enabling an operation with the highest possible pulse width modulation, i.e. the highest possible heating rate during a period, in case of a particular required heating output and/or a given supply voltage. This may be accomplished by switching the heating system or the switching device to a heating mode in which the overall heating resistance is the highest settable total resistance at which the required heating output can be provided at a given supply voltage. In this way the highest possible part of a pulse period may be used for heating. The control device may be designed to communicate with one or more sensors. It may be advisable that the control device is connected to a voltage sensor. The voltage sensor may be designed for measuring the heating voltage. It is feasible that the voltage sensor may be capable of transmitting a voltage signal to the control device which relates to the measured voltage. In particular, it may be contemplated that the control device is capable of transmitting appropriate switching and/or control signals to the switching device and/or the pulse width modulation device.

In particular, it may be contemplated that the control device is designed to control the switching device for an operation or the electric heating in the first heating mode if a voltage value of a supply voltage of the electric heating ranges between a first threshold value and a second threshold value which is lower than the first threshold value. The first threshold value may, for example, be a nominal value of a supply voltage or be greater than it by an appropriate value. In particular, the first threshold value may be greater than the nominal value by approximately 1%, 5%, 10%, 15% or 20%. In this case the first heating mode is substantially equal to a nominal operating mode in which the supply voltage is in the range of the nominal value.

The control device may be designed to control the switching device for an operation of the electric heating in the second heating mode if a voltage value of a supply voltage of the electric heating is smaller than a third threshold value. The third threshold value may, in particular, be smaller than or equal to the second threshold value. Thus, in case of a high supply voltage, the heating may be operated in the first heating mode in which a high overall heating resistance is present since the first resistance heating device and the second resistance heating device are electrically connected in series. Thus, a pulse width modulation can be performed so that a heating current does actually flow during a time of a pulse period which is as long as possible. Given an identical required output and a low supply voltage, the electric heating may be switched to an operation in the second heating mode in which a low overall heating resistance is given.

It may be advisable that the control device is designed to control the switching device for an operation of the electric heating in a third heating mode if a voltage value of a supply voltage of the electric heating ranges from the third threshold value to a fourth threshold value which is larger than the third threshold value. The fourth threshold value may, in this case, in particular be smaller than a second threshold value as mentioned above. Consequently, a heating mode in which only one of the resistance heating devices is used for heating results between an operation with the resistance heating device connected in parallel and the heating mode with the resistance heating device connected in series. In this way an even broader spectrum of operating options is available. Of course it may be contemplated that the control device is designed to switch the switching device to an operation of the electric heating in a fourth heating mode if a voltage value of a supply voltage of the electric heating ranges from the fourth threshold value to a fifth threshold value which is larger than the fourth threshold value. This may be particularly advisable if the resistance values of the first resistance heating device and the second resistance heating device are different from each other. In this connection it may be contemplated to use or switch the resistance heating device having the higher resistance value for heating in the fourth heating mode while in the third heating mode the resistance heating device having the lower heating resistance is used or switched for heating.

In particular, a vehicle equipped with an electric heating as described herein is feasible. In this case a supply voltage of the electric heating may be provided by an on-board network of the vehicle. The on-board network may provide a supply voltage having one of the abovementioned nominal values. The value of the supply voltage may, depending on the operating state and/or the type of vehicle, for example be in a range from 0 V, 100 V, 150 V, 200 V, 250 V and the nominal value. In particular, the vehicle may be an electric vehicle.

Further, a method for controlling an electric heating is described, wherein the electric heating may be one of the electric heaters described herein. For a heating operation the first resistance heating device and the second resistance heating device are optionally switched to a first heating mode for which the first resistance heating device and the second resistance heating device are electrically connected in series, or to a second heating mode for which the first resistance heating device and the second resistance heating device are electrically connected in parallel. It may be contemplated that the first resistance heating device and the second resistance heating device are switched to a third heating mode in which solely the first resistance heating device or the second resistance heating device are operated for a heating operation. In particular, it may be contemplated that the resistance heating device not operated in the third heating mode is turned off for this heating mode. It may be advisable to switch the first resistance heating device to a sole operation for a first heating mode and to switch the second resistance heating device to a sole heating operation for a fourth heating mode.

The switching of the resistance heating devices for the corresponding heating mode may be effected by the switching device. In the first heating mode and/or in the second heating mode the first resistance heating device and the second resistance heating device may be connected to a common power source. It may be contemplated that the switching device is controlled by a control device for switching between the heating modes. The control device may communicate with a higher-level control device and/or be formed as a common control device also controlling other devices apart from the electric heating. The control device may be connected to or communicate with a setting device for setting a required heating output. The control device may control the switching device and/or the pulse width modulation device based on a voltage value of a supply voltage and/or a required heating operation of the electric heating. It may be particularly advisable that the control device controls the switching device for a heating mode permitting an operation with a pulse width modulation which is as high as possible, i.e. a heating rate which is as high as possible during a period, in case of a specific required heating output and/or a given supply voltage. This may be accomplished by switching the heating system or the switching device in a heating mode in which the overall heating resistance is the highest overall resistance which can be set at a given supply voltage in which the required heating output can be provided. The control device may communicate with one or more sensors. It may be advisable that the control device is connected to a voltage sensor. The voltage sensor may measure the heating voltage. It is feasible that the voltage sensor transmits a voltage signal relating to the measured voltage to the control device. The control device may control the switching device based on signals it receives from the sensor or the sensors, particularly from a voltage sensor, and/or the setting device. It may be contemplated that the control device controls the switching device for an operation of the electric heating in the first heating mode if a voltage value of a supply voltage of the electric heating ranges from a first threshold value to a second threshold value which is lower than the first threshold value. The control device may control the switching device for an operation of the electric heating in the second heating mode if a voltage value of a supply voltage of the electric heating is lower than a third threshold value. The third threshold value may, in particular, be smaller than or equal to the second threshold value. Depending on the heating mode in which the heating system is operated, a pulse width modulation may be performed so that a heating current will actually flow during a time of a pulse period which is as long as possible. In case of an identical required output and a lower supply voltage the electric heating may be switched to an operation in the second heating mode in which a lower overall heating resistance prevails to be capable of providing the required heating output despite of the low supply voltage. It may be advisable that the control device controls the switching device for an operation of the electric heating in a third heating mode if a voltage value of a supply voltage of the electric heating ranges from the third threshold value and a fourth threshold value which is larger than the third threshold value. The forth threshold value may, in this case, in particular be smaller than a second threshold value as mentioned above. It may be contemplated that the control device controls the switching device for an operation of the electric heating in a fourth heating mode if a voltage value of a supply voltage of the electric heating ranges from the fourth threshold value to a fifth threshold value which is larger than the fourth threshold value. This may be particularly advisable if the resistance values of the first resistance heating device and the second resistance heating device differ from each other. In this connection it may be contemplated to use or switch the resistance heating device having the higher resistance value for heating in the fourth heating mode while the resistance heating device having the lower heating resistance is used or switched for heating in the third heating mode. For the threshold values and the voltage values what was said with regard to the electric heating applies.

The invention will now be described by way of example with the aid of preferred embodiments with reference to the accompanying drawings in which.

Figure 1:
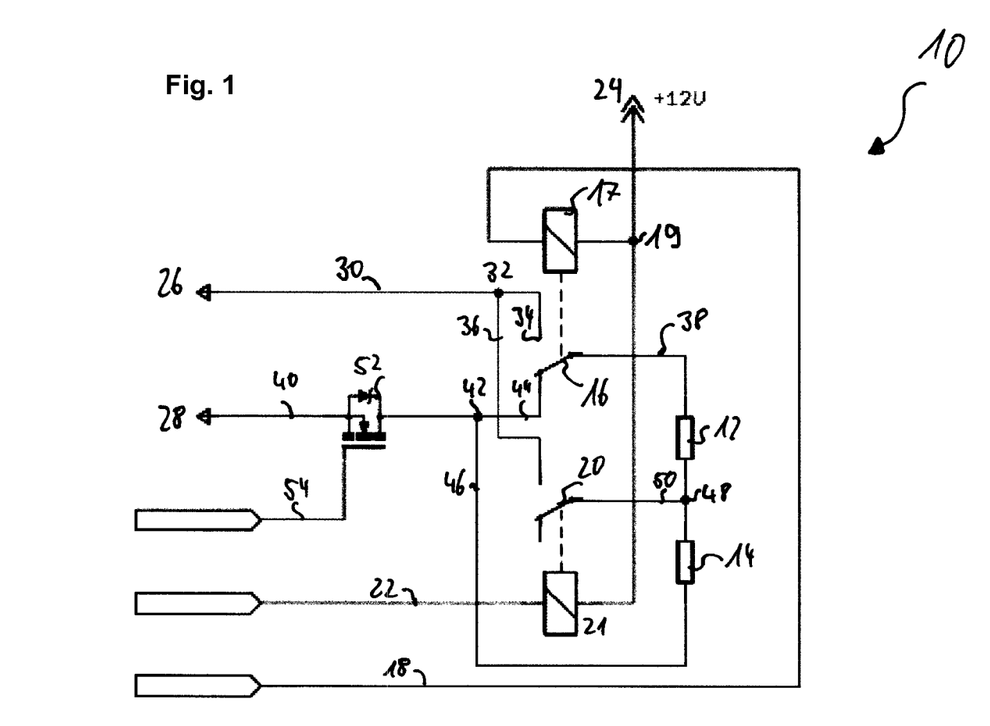
FIG. 1 shows a schematic representation of an electric heating comprising a relay circuit.

In FIG. 1, an electric heating 10 is schematically shown. The electric heating 10 comprises a first heating resistor 12 and a second heating resistor 14 which serve as a first resistance heating device and a second resistance heating device in the present example. A first switch 16 is provided which can be switched between an "on" state and an "off" state via a coil 17. The coil 17 can be supplied with power via a first switching line 18. The first switch 16 is formed as a relay switch. In FIG. 1, the switch is shown in the "off" state. Further, a second switch 20 is provided which can be switched between an "on" state and an "off" state via a coil 21. In FIG. 1, the switch 20 which is formed as a relay switch is shown in the "off" state. The coil 21 can be supplied with power via a second switching line 22 to switch the switch 20. The first switch 16, the second switch 20 and the associated coils 17, 21 may be regarded as elements of a switching device. The switching lines 18 and 22 are connected to a common pole of a switching voltage supply 24. To this end a switching node 19 of the switching lines 18 and 22 is provided which is connected to the switching lines 18 and 22 via switching coils 17, 21. A switching voltage supply may, in this example, provide a switching potential of 12 V for the switching lines 18, 22. If an associated switching voltage is applied via the switching line 18, the coil 17 can be supplied with power so that the first switch 16 is switched to the "on" state. Analogously the coil 21 can be supplied with power to switch the switch 20 by applying a voltage signal to the switching line 22.

Further, poles 26, 28 of a voltage supply for the electric heating 10 are provided via which a heating voltage is provided. A supply line 30 connected to the first pole 26 of the voltage supply branches into a first supply branch 34 and a second supply branch 36 at a supply node 32. The first supply branch 34 is connected to the first switch 16. The second supply branch 36 is connected to the second switch 20. The first supply branch 34 may be connected to a first heating line 38 in which the first heating resistor 12 is disposed via the first switch 16. Further a second supply line 40 is provided which is connected to the second pole of the voltage supply. The second supply line 40 branches into a third supply branch 44 and a fourth supply branch 46 at a second supply node 42. The third supply branch 44 of the second supply line 40 is connected to the first switch 16. The first switch 16 is disposed so that it connects the heating line 38 to the third supply branch 44 of the second supply line 40 in the "off" state. In the "on" state the first switch 16 connects the heating line 38 to the first supply branch 34 of the first supply line 30. The fourth supply branch 46 of the second supply line 40 is connected to the first heating line 38 via a heating node 48. Between the heating node 48 and the second supply node 42 the second heating resistor 14 is connected in the fourth supply branch 46. The first heating resistor 12 is connected in the heating line 38 between the heating node 48 and the first switch 16. The second switch 20 is connected to the heating node 48 via a relay line 50. The second switch 20 is connected to the heating node 48 via a relay line 50. In the "on" state the second switch 20 connects the second supply branch 36 of the first supply line 30 to the heating node 48. In the "off" state no conducting connection between the heating node 48 and one of the supply lines 30, 40 is established via the second switch 20. Further, a pulse width modulation device 52 is provided between the second supply node 42 of the second supply line 40 and the second pole of the supply voltage 28. The pulse width modulation device 52 is, in this case, formed as a transistor, in this example as an IGB transistor. A pulse width modulation signal or pulse control signal is transmitted to the pulse width modulation device 52 as a control signal via a control line 54. In particular, the input and the output (collector and emitter) of the pulse width modulation device 52 may be arranged so that the input is connected to the second supply node 42 and the output to the pole 28. The control input (gate) of the pulse width modulation device 52 is connected to the control line 54. If the pulse width modulation device 52 is switched to passage by the pulse width modulation signal or the pulse control signal, on principle, a heating current may flow between the poles 26, 28 of the voltage supply. During the times in which no signal is applied to the control line 54 because, for example, the signal runs through a periodical zero point or no signal is applied at all, accordingly, no current can flow between the poles 26, 28 of the supply voltage. Consequently, a first turn-off path of the electric heating 10 is enabled via the pulse width modulation device 52 because without a pulse width modulation signal being applied via the control line 54 the electric heating 10 is, as a consequence, turned off. The pulse control signal may be a rectangular signal. The arrows connected to the switching lines 18, 22 and the control line 54 represent outputs of a control device which is capable of applying switching signals or pulse control signals to the switching lines 18, 22 or the control line 54. The control device controls the switching device and/or the pulse width modulation device 52 based on a voltage value of the supply voltage provided via the poles 26, 28 and/or a required heating output of the electric heating. To this end it outputs associated switching signals and/or control signal via its outputs.

The switching device of the electric heating 10 which, in this case, comprises the switches 16 and 20, may be switched as follows.

If the first switch 16 and the second switch 20 are both in the "off" state, no conducting connection between the first pole 26 and the second pole 28 of the voltage supply is possible. Consequently, a second turn-off path which is independent of the first turn-off path is established via the switches 16, 20.

If the first switch 16 is in the "off" state and the second switch 20 is in the "on" state the first heating resistor 12 and the second heating resistor 14 are connected in parallel. The first supply node 32 is conductively connected to the second supply line 40 via the second switch 20, the heating node 48, the second heating resistor 14 and the second supply node 42. Further an electrically conductive connection of the first supply line 30 to the second supply line 40 parallel thereto is established via the second supply branch 36, the second switch 20, the heating node 48, the heating resistor 12 in the heating line 36 and the switch 16. In fact, the switch 16 connects the heating line 38 to the third supply branch 44 of the second supply line 40 in the "off" state. Consequently, the first heating resistor 12 and the second heating resistor 14 can be operated in parallel and supplied with a heating current depending on the pulse width modulation device 52 controlled via the control line 54.

If the first switch 16 is in the "on" state and the second switch 20 is in the "off" state a conducting connection between the first pole 26 of the voltage supply to the second pole 28 of the voltage connection is established via the first supply line 30, the first supply branch 34, the "turned-on" switch 16, the heating line 38 comprising the second heating resistor 14 via the heating node 48, the fourth supply branch comprising the second heating resistor 14 and the second supply node 42. Consequently, the first heating resistor 12 and the second heating resistor 14 are supplied with a heating current in series and operated in a series connection.

If the first switch 16 and the second switch 20 are in the "on" state, respectively, a connection to the second supply line 40 is established from the first supply line 30 via the first supply node 32, the second supply branch 36, the second switch 20, the relay line 50, the heating node 48, the fourth supply branch 46 including the second heating resistor 14 and the second supply node 42. Consequently, the second heating resistor 14 can be supplied with power. The first heating resistor 12 in the heating line 38 is connected to the first supply node 32 both via the second switch 20 and the second supply branch 36 as well as via the first switch 16 and the first supply branch 34 so that no voltage drop occurs across the first heating resistor 12. Therefore, in this case, only the second heating resistor 14 is supplied with power and thus operated for heating depending on the control of the pulse width modulation device 52.

In this example low switching losses occur since only the pulse width modulation device 52 is formed as a semiconductor route requiring a considerable switching load. The switches 16, 20 can, as relays, be switched substantially off-load. In addition, the switching means may be designed so that the relays are respectively in an "off" state in case of a defect control, for example if the relays become disconnected whereby the heating resistors are automatically disconnected from the supply voltage.

Figure 2:
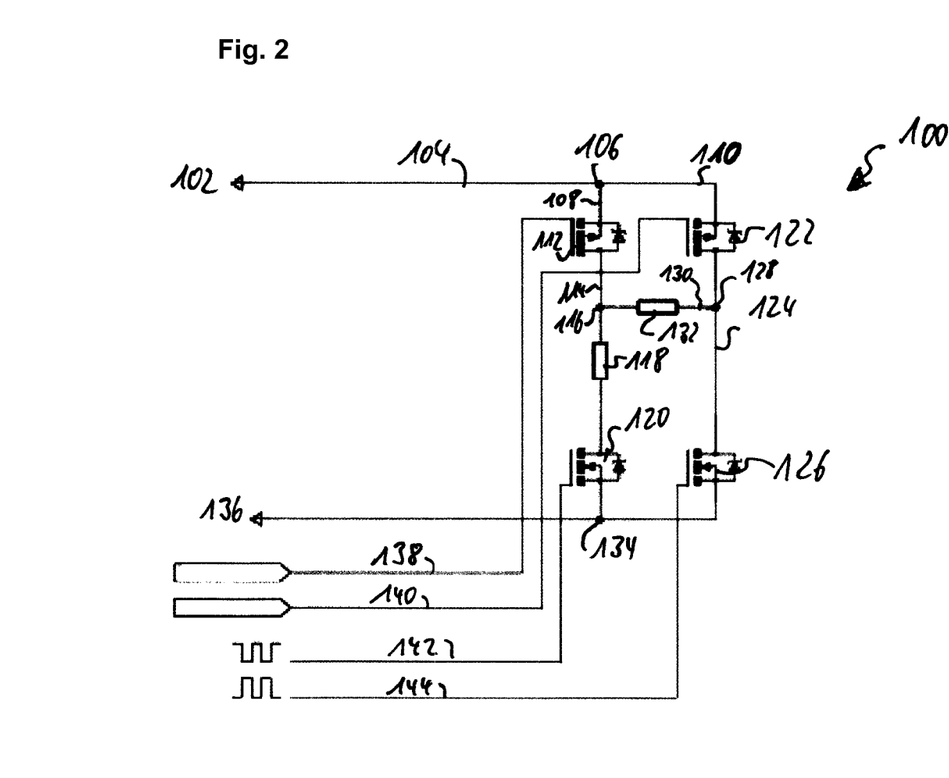
FIG. 2 shows a schematic representation of an electric heating comprising a quasi-full bridge.

FIG. 2 shows a schematic representation of a heating 100 comprising a quasi-full bridge. The electric heating 100 comprises a first supply line 104 connected to a first pole 102 of a voltage supply. The first supply line 104 branches into a first supply branch 108 and a second supply branch 110 at a first supply node 106. The first supply branch 108 is connected to a high-side first switching transistor 112. A first heating line 114 connects the higher-side first switching transistor 112 formed as an IGB transistor to a heating node 116. In particular, the input (collector) of the first switching transistor 112 may be connected to the first supply branch 108 and the output (emitter) to the first heating line 114. A first heating resistor 118 and an input (collector) of a first pulse width modulator 120 are connected in series to the heating node 116. This lower-side pulse width modulator 120 is formed as an IGB transistor. The second supply branch 110 is connected to the input of a higher-side second switching transistor 122 which is also formed as an IGB transistor. The output of the second switching transistor 122 is connected to the input of a second pulse width modulator 126 via a line 124. In the line 124, a second heating node 128 is provided between the second switching transistor 122 and the second pulse width modulator 126. A heating line 130 in which a second heating resistor 132 is connected branches from the second heating node 128. The heating line 130 is connected to the first heating node 114 so that the second heating resistor 132 is connected between the first heating node 114 and the second heating node 128. The outputs of the first pulse width modulator 120 and the second pulse width modulator 126 are connected to a common output node 134 via lines. The output node 134, on the other hand, is connected to a second pole 136 of the voltage supply. Consequently, the outputs of the pulse width modulators 120, 126 are connected to the second pole 136 of the voltage supply. A first switching line 138 is connected to the control input (gate) of the first switching transistor 112 to control it. In a similar manner, a second switching line 140 is connected to the control input of the second switching transistor 122 to control it. Associated switching signals may be output to the switching transistors 112, 122 via the switching lines 138, 140 to permit a current flow from the first pole 102 of the voltage supply via the inputs and outputs of the switching transistors 112, 122. A first control line 142 is connected to the control input of the lower-side first pulse width modulator 120. In accordance with a pulse width modulated signal the first pulse width modulator 120 may be turned on or off via the first control line 142. A second control line 144 is connected to the second pulse width modulator 126. Like the first pulse width modulator 120 the second pulse width modulator 126 may be turned on or off according to a signal applied to the second control line 144. The first pulse width modulator 120 and the second pulse width modulator 126 are formed separately and controllable independently of each other. They may be regarded as elements of a pulse width modulation device. In particular, it may be contemplated that the first pulse width modulator 120 and the second pulse width modulator 126 are controlled by pulse width modulated rectangular signals phase-shifted by 180° as indicated by the wave forms of the signals in FIG. 2. In this way an altogether reduced ripple current will result, whereby the on-board network pro-vides a more stable current or voltage supply. If both pulse width modulation devices 120, 126 are not in the "on" state, no current can flow between the first pole 102 of the voltage supply and the second pole 136 of the voltage supply. Consequently a first turn-off path is established by the independently switchable pulse width modulators 120, 126. Particularly in case of a failure of the control signals for the pulse width modulators it is ensured that the heating is not operated. As mentioned in connection with FIG. 1 the switching lines 138, 140 and the control lines 142, 144 are connected with the outputs of a control device not described in any detail which is capable of applying switching signals or pulse control signals to the switching lines 138, 140 or the control lines 142, 144. The control device controls the switching device and/or the pulse width modulation de-vice on the basis of a voltage value of the supply voltage supplied by the poles 102, 136 and/or a required heat output of the electric heating. To this end it outputs associated switching signals and/or control signals via its outputs. In this example the switching transistors 112, 122 may be regarded as elements of a switching device. The heating resistor 118 is equivalent to a first resistance heating device, and the heating resistor 132 to a second resistance heating device.

If the higher-side first switching transistor 112 is in the "off" state and the higher side second switching transistor 122 is in the "on" state advisably only the first pulse width modulating device 120 is turned "on". Consequently, there is a current flow from the first pole 102 of the voltage supply via the second supply branch 110, the first switching transistor 122, the second heating node 128, the heating line 130 including the second heating resistor 132, the first heating node 114, the first heating resistor 118 and the first pulse width modulator 120 to the output node 134. If the second pulse width modulator 126 is not controlled in this case and remains in the "off" state in which it does not conduct any current the first heating resistor 118 and the second heating resistor 132 are connected in series with regard to the conducting path via the first pulse width modulator 120. In consequence, a heating current may flow via the heating resistors 118, 132 connected in series depending on the control signal applied to the first pulse width modulator 120. In this state, a short circuit between the second switching transistor 122 and the second pulse width modulator 126 should be avoided, for example by the control device not switching the second pulse width modulator 126 to the "on" state.

In case the first switching transistor 112 is switched to an "on" state and the second switching transistor 122 is switched to an "off" state different possible current paths will be established depending on the control of the pulse width modulators 120. If only the first pulse width modulator 120 is controlled by a pulse width modulated control signal and the second pulse width modulator 126 remains turned off a current path from the first pole 102 via the first supply line 104, the first supply node 106, the first switching transistor 112, the first heating node 114, the first heating resistor 118 to the output node 134 and therefore to the second pole 136 of the voltage supply is established via the first pulse width modulator 120. Therefore only the first heating resistor 118 contributes to heating. In a case in which the first pulse width modulation device 120 is not controlled, but the second pulse width modulator 126 is, a conduction path will result in which current will only flow through the second heating resistor 132, not, however, through the first heating resistor 118. If both pulse width modulation devices 120, 126 are controlled to an "on" state the first heating resistor 118 and the second heating resistor 132 are passed substantially in parallel. A parallel connection of the heating resistors 118, 132, however, is, strictly speaking, only obtained in a case in which the two pulse width modulating devices 120, 126 are simultaneously switched to an "on" state. This may, in particular, be the case if the signals for the pulse width modulation of the pulse width modulation devices 120, 126 have identical phases or a pulse width modulation of one hundred percent is achieved in which a pulse extends across a full pulse period. For a phase-shifted control, current may alternatingly flow through the first heating resistor 118 and the second heating resistor 132, namely when one of the pulse width modulators 120, 126 is just in an "on" state owing to a pulse-width modulated signal, and the other pulse width modulator 126 is in an "off" state. Consequently, no connection in parallel in the narrow sense of the word is given during such times.

For the example shown in FIG. 2, therefore, the option arises to simultaneously switch the first switching transistor 112 and the second switching transistor 122 to an "off" state—a separate second turn-off path redundant with regard to the first turn-off path which can be switched independent of it. If both switching transistors 112 and 122 are switched to the "on" state different current paths may result depending on the control of the transistors. In this case as well, a short circuit of the switching transistor 122 and the pulse width modulator 126 should be avoided, for example by an appropriate control by the control device. In particular, it may, in general, be contemplated that a simultaneous "on" state of the second switching transistor 122 and the second pulse width modulator 126 is prevented or prohibited by the control device. If the second pulse width modulator 126 is retained in the "off" state a preferred current path through the first heating resistor 118 will result which dominates the heating process.

Since the first switching transistor 112 and the first pulse width modulator 120 are, contrary to the second switching transistor 122 and the second pulse width modulator 126, not directly connected to each other since the heating resistor 118 is connected between them the circuit shown in FIG. 2 can be referred to as a quasi-full bridge. It may be manufactured in a compact design as a pure semiconductor solution. It may be contemplated to realize the four semiconductor circuits, i.e., for example, the first switching transistor 112, the second switching transistor 122 and the first and the second pulse width modulator 120, 126, as a bridge module. In this example the transistors are realized as IGB transistors. However, it is also possible to use any suitable type of transistors.

Figure 3:
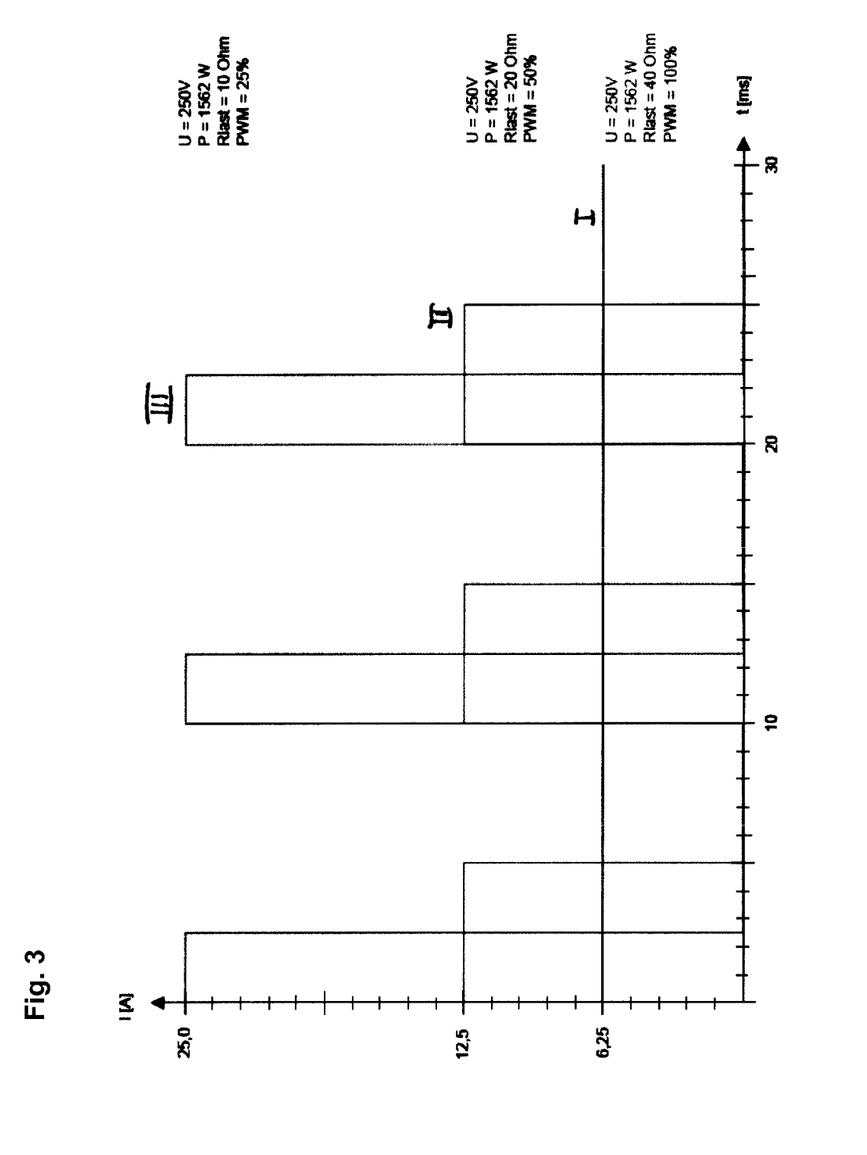
FIG. 3 shows a diagram comprising differently pulsed heating currents.

FIG. 3 shows an illustration of a possible pulse current draw in case of different heating resistance values of a circuit. A heating current provided by the voltage supply and having a current intensity I in Ampere A depending on the time t in milliseconds ms is shown. U designates the applied heating voltage, P the heating output, Rlast the overall heating resistance, and PWM the extent of the pulse width modulation. For the shown curves I, II and III the current draw of the heating amounts to 1,562 watts, respectively. This is equal to the required heating output of the heating. In general, the heating power consumption can be represented as follows:

$$P = I_{\it eff}^2 \times R$$
$$= (I_{amp} \times (vt)^{1/2})^2 \times R$$
$$= I_{amp}^2 \times vt \times R,$$

wherein R designates the overall resistance, $I_{\it eff}$ designates the effective current intensity of the heating current modified by the pulse modulation, $I_{amp}$ designates the maximum current intensity of the heating current, and vt designates the pulse duty factor of the pulse width modulation, i.e. the ratio between the time in which a heating current flows during a pulse period and the duration of the pulse period. Therefore the highest current intensity values of a curve in FIG. 3 respectively correspond to $I_{amp}$. In this example heating currents having a rectangular wave form are generated.

The heating may be one of the heaters shown in FIG. 1 or FIG. 2. The first heating resistor and the second heating resistor were designed for a resistance of approximately 20 ohms, respectively. For a parallel connection of the heating resistors, therefore, an overall load of approximately Rlast=10 ohms is obtained. For a circuit with a single load in which only one heating resistor is supplied with a heating current a heating resistance value of approximately Rlast=20 ohms will be obtained. In case of a series connection of the heating resistor the heating resistance value will amount to approximately Rlast=40 ohms. For all three curves a supply voltage of U=250 V was assumed.

The first curve I corresponds the first heating mode, i.e. a series connection of the heating resistors which corresponds to the case illustrated in FIG. 1 in which the first switch 16 is turned on and the second switch 20 is turned off, or the case shown in FIG. 2 in which the first switching transistor 112 is turned off and the second switching transistor 122 is turned on. In this case a pulse width modulation of 100% can be accomplished for the predetermined output of P=156 W so that a substantially constant current is obtained. The current intensity I of the heating current amounts to 6.25 A.

If, in a third heating mode, only one of the heating resistors is used, which is consistent with the case illustrated in FIG. 1 in which the first switch 16 and the second switch 20 are turned on, or the case illustrated in FIG. 2 in which, in case of a corresponding control of the pulse width modulating device, the first switching transistor 112 is turned on and the second switching transistor 122 is turned off, the overall heating resistance Rlast amounts to 20 ohms. The pulse width modulation amounts to 50%, whereby the pulsed signal visible in curve II is obtained. The current intensity flowing through the selected heating resistor during a pulse amounts to 12.5 A according to the above formula.

For the third curve III the second heating mode, i.e. a parallel connection of the heating resistors is assumed. Correspondingly, the lowest overall heating resistance of 10 ohms is obtained. This corresponds to the case illustrated in FIG. 1 in which the first switch 16 is turned off and the second switch 20 is turned on, or to the case illustrated in FIG. 2 in which, in case of a corresponding control of the pulse width modulation device, the first switching transistor 112 is turned on, and the second switching transistor 122 is turned off. The pulse width modulation is only 25% which results in a yet increased current intensity of 25.0 A.

From FIG. 3 it can be seen that in case of a required heating output of P=1562 W, a series connection of the heating resistors is desirable. In fact, in this way a low current intensity can be used in case of a stable signal (high pulse duty factor) whereby switching loads and ripple current effects have the minimum effect. At the same time, in this case, the heating output can be controlled more precisely than in case of curves II and II since the full width of the pulse wave modulation can be made use of. In particular, it has to be considered that a pulse width modulation can usually only be controlled with an accuracy of approximately 1% without substantial and cost-intensive efforts. Therefore, should a lower heating output than 1526 W be required, a more accurate control of the heating output can be realized than for curves II and III. Should a higher heating output be required, this can obviously not be realized by reducing the pulse width modulation. Therefore, for a higher heating output, the heating has to be connected so that the heating resistors are no longer connected in series, i.e. so that curve I is left. For a required heating output of up to approximately 3,000 W, preferably, curve II is turned to, i.e. only one of the heating resistors is actuated. For a heating output of more than approximately 3,000 W up to a maximum output of approximately 6,000 W, as envisaged in this case, preferably the parallel connection of the heating resistors in the first heating mode is used, i.e. curve III is selected.

The features of the invention disclosed in the above description, in the drawings as well as in the claims may be important for the realization of the invention both individually and in any combination.

The invention claimed is:

1. An electric heating comprising:
at least one first resistance heating device and a second resistance heating device,
at least one pulse width modulation device capable of a pulse width modulated operation of the first resistance heating device and/or the second resistance heating device,
as well as at least one switching device,
wherein the switching device is capable of, for a heating operation, selectively switching the first resistance heating device and the second resistance heating device between a first heating mode in which the first resistance heating device and the second resistance heating device are electrically connected in series, and a second heating mode in which the first resistance heating device and the second resistance heating device are electrically connected in parallel,
wherein the electric heating comprises a control device to control the switching device based on a sensed voltage value of a supply voltage of the electric heating.

2. The electric heating according to claim 1, wherein the switching device is further capable of, for a heating operation, switching the first resistance heating device and the second resistance heating device to a third heating mode in which the first resistance heating device or the second resistance heating device is solely operated.

3. The electric heating according to claim 1, wherein the switching device is formed as a relay circuit.

4. The electric heating according to claim 1, wherein the switching device is formed as a quasi-full bridge.

5. The electric heating according to claim 1, wherein the heating resistance value of the first resistance heating device is substantially identical to the heating resistance value of the second resistance heating device.

6. The electric heating according to claim 1, wherein, in the first heating mode and/or in the second heating mode, the first resistance heating device and the second resistance heating device are connected to a common current source.

7. The electric heating according to claim 1, wherein the control device is designed to additionally control the pulse width modulation device based on the voltage value of the supply voltage and/or a required heating output of the electric heating.

8. The electric heating according to claim 1, wherein the control device is designed to control the switching device for an operation of the electric heating in the first heating mode if the voltage value of the supply voltage of the electric heating ranges from a first threshold value to a second threshold value which is smaller than the first threshold value.

9. The electric heating according to claim 1, wherein the control device is designed to control the switching device for an operation of the electric heating in the second heating mode if the voltage value of the supply voltage of the electric heating is smaller than a third threshold value.

10. The electric heating according to claim 9, wherein the control device is designed to switch the switching device for an operation of the electric heating in a third heating mode if the voltage value of the supply voltage of the electric heating ranges from the third threshold value to a fourth threshold value which is larger than the third threshold value.

11. A vehicle comprising an electric heating according to claim 1.

12. The vehicle according to claim 11, wherein the supply voltage of the electric heating is provided by an on-board network of the vehicle.

13. The vehicle according to claim 11, wherein the vehicle is an electric vehicle.

14. A method for controlling an electric heating according to claim 1 in which the switching device, for a heating operation, selectively switches the first resistance heating device and the second resistance heating device between a first heating mode for which the first resistance heating device and the second resistance heating device are connected in series, and a second heating mode in which the first resistance heating device and the second resistance heating device are electrically connected in parallel.

* * * * *